(12) United States Patent
Sandstrom

(10) Patent No.: US 10,785,970 B1
(45) Date of Patent: Sep. 29, 2020

(54) SPINNING TYPE FISHING REEL WITH BI-DIRECTIONALLY ROTATING ROTOR WITH DRAG CONTROL TO PREVENT LINE TWIST

(71) Applicant: Thomas Sandstrom, Oakland Park, FL (US)

(72) Inventor: Thomas Sandstrom, Oakland Park, FL (US)

( * ) Notice: Subject to any disclaimer, the term of this patent is extended or adjusted under 35 U.S.C. 154(b) by 134 days.

(21) Appl. No.: 16/123,422

(22) Filed: Sep. 6, 2018

Related U.S. Application Data

(60) Provisional application No. 62/554,679, filed on Sep. 6, 2017.

(51) Int. Cl.
*A01K 89/01* (2006.01)

(52) U.S. Cl.
CPC .............. *A01K 89/01082* (2015.05)

(58) Field of Classification Search
CPC ............ A01K 89/0114; A01K 89/0117; A01K 89/029; A01K 89/011223
See application file for complete search history.

(56) References Cited

U.S. PATENT DOCUMENTS

| | | | |
|---|---|---|---|
| 3,814,349 A | 6/1974 | Menne | |
| 4,328,937 A | 5/1982 | Holahan et al. | |
| 4,402,469 A * | 9/1983 | Stiner | A01K 89/027 242/245 |
| 4,416,427 A | 11/1983 | Kawai | |
| 4,436,254 A | 3/1984 | Normann | |
| 4,535,953 A | 8/1985 | Omori | |
| 4,577,807 A | 3/1986 | Urso | |
| 4,634,074 A | 1/1987 | Ohmori | |
| 4,773,611 A * | 9/1988 | Kaneko | A01K 89/0114 242/241 |
| 4,892,267 A | 1/1990 | Webb | |
| 5,118,048 A | 6/1992 | Childre et al. | |
| 5,277,379 A * | 1/1994 | Kaneko | A01K 89/029 242/245 |
| 5,443,571 A * | 8/1995 | Kang | A01K 89/01 242/311 |
| 5,575,431 A * | 11/1996 | Henriksson | A01K 89/0114 242/241 |
| 5,605,299 A * | 2/1997 | Henriksson | A01K 89/0114 242/247 |
| 5,738,292 A * | 4/1998 | Kang | A01K 89/0117 242/247 |
| 6,021,970 A | 2/2000 | Fritts et al. | |
| 6,098,908 A * | 8/2000 | Ng | A01K 89/027 242/245 |
| 6,179,236 B1 | 1/2001 | Jang | |

(Continued)

*Primary Examiner* — Emmanuel M Marcelo
(74) *Attorney, Agent, or Firm* — Mark D. Bowen; Malin Haley DiMaggio & Bowen, P.A.

(57) ABSTRACT

A fishing spinning reel that eliminates problems associated with line twist by providing a rotor adapted for both forward and reverse rotation wherein a drag assembly applies drag to the rotor to prevent the rotor from imparting twist on the line when in the winding mode. By enabling the rotor to rotate in a reverse direction with the application of drag the present invention prevents line twist when fighting a fish by allowing the rotor to rotate in a reverse direction and/or to remain stationary as the handle is cranked thereby preventing the rotor from imparting twist on the line.

5 Claims, 2 Drawing Sheets

(56) References Cited

U.S. PATENT DOCUMENTS

| | | | |
|---|---|---|---|
| 7,178,751 B1 | 2/2007 | Isaacs | |
| 7,234,660 B2 | 6/2007 | Kitajima et al. | |
| 8,469,300 B2 | 6/2013 | Camp | |
| 8,783,596 B2 | 7/2014 | Kendra | |
| 8,919,684 B1 | 12/2014 | Alzamora et al. | |
| 9,119,384 B2 | 9/2015 | Harris | |
| 2010/0187346 A1* | 7/2010 | Ochiai | A01K 89/0192 242/242 |
| 2011/0315801 A1* | 12/2011 | Hayashi | A01K 89/0117 242/247 |
| 2014/0084097 A1* | 3/2014 | Taylor | A01K 89/0105 242/255 |
| 2016/0270381 A1 | 9/2016 | Saito | |

\* cited by examiner

SPINNING TYPE FISHING REEL WITH BI-DIRECTIONALLY ROTATING ROTOR WITH DRAG CONTROL TO PREVENT LINE TWIST

CROSS REFERENCE TO RELATED APPLICATIONS

This application claims the benefit of Provisional U.S. Patent Application Ser. No. 62/554,679, filed on Sep. 6, 2017.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates to fishing reels, and more particularly to a spinning type fishing reel having a drag controlled bi-directionally rotating rotor to prevent line twist.

2. Description of Related Art

A spinning reel is a common type of fishing reel. Conventional spinning reels are characterized as having a body assembly with an open-faced spool disposed with an axis in generally parallel relation with the fishing pole. A rotor is disposed in surrounding relation with the spool and includes a bail arm having a line guide for guiding the fishing line onto the spool. The bail arm is pivotable between an open position for casting, and a closed position for reeling the line back onto the spool. A crank having a handle is mounted to one side of the body assembly and functions to reel in the fishing line. A drive gear actuated by the crank is coupled to a pinion gear coupled to the rotor to cause rotation thereof to wind the line back on to the spool. A spool shaft passes axially through an axial aperture defined in pinion gear and is attached to the spool. The spool shaft is caused to reciprocate by an oscillation gear and slider coupling driven by the crank.

The body assembly and mechanisms are preferably designed such that the crank may be mounted on either side of the spool to accommodate both left and right-handed fishermen. With a conventional spinning reel, rotation of the crank causes the rotor to rotate relative to the spool whereby fishing line, guided by the line guide affixed to the bail, is wound onto the spool. At the same time the spool axially oscillates relative to the rotor, and more particularly, to the line guide so as to result in even winding of the line about the spool.

A significant problem associated with conventional spinning reels relates to the inducement of line twist due to the winding motion of the rotor and line guide about the rotationally stationary spool. The amount of line twist increases significantly when the drag setting and force on the line is such that the rotor spins while the line is relatively stationary and/or being reeled in, or let out, slowly. Excessive line twist results in backlashes and birds nest entanglements that render the line unusable. In order to eliminate the accumulated twist, the fisherman must often let out the line to relieve the twist, and reel the line back in evenly.

Accordingly, there exists a need in the art for advancements to spinning reels that eliminate the problems related to line twist.

BRIEF SUMMARY OF THE INVENTION

The present invention overcomes the limitations and disadvantages present with conventional fishing reels by providing an improved spinning reel that eliminates problems associated with line twist by providing a rotor adapted for both clockwise and counterclockwise rotation wherein a drag assembly applies drag to the rotor to prevent the rotor from imparting twist on the line when in the winding mode. By enabling the rotor to rotate in a reverse direction with the application of drag the present invention prevents line twist when fighting a fish by allowing the rotor to rotate in a reverse direction and/or to remain stationary as the handle is cranked thereby preventing the rotor from imparting twist on the line.

Accordingly, it is an object of the present invention to provide an improved spinning reel for fishing.

It is another object of the present invention to provide a modified spinning reel having a bi-directionally rotating rotor.

Still another object of the present invention is to provide a spinning reel wherein a drag mechanism is configured to apply adjustable drag to the rotor thereby taking the rotor out of sync with the winding crank.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or maximum. Furthermore, such an interpretation should apply regardless of the breadth of the range or the characteristics being described.

Figure 1:
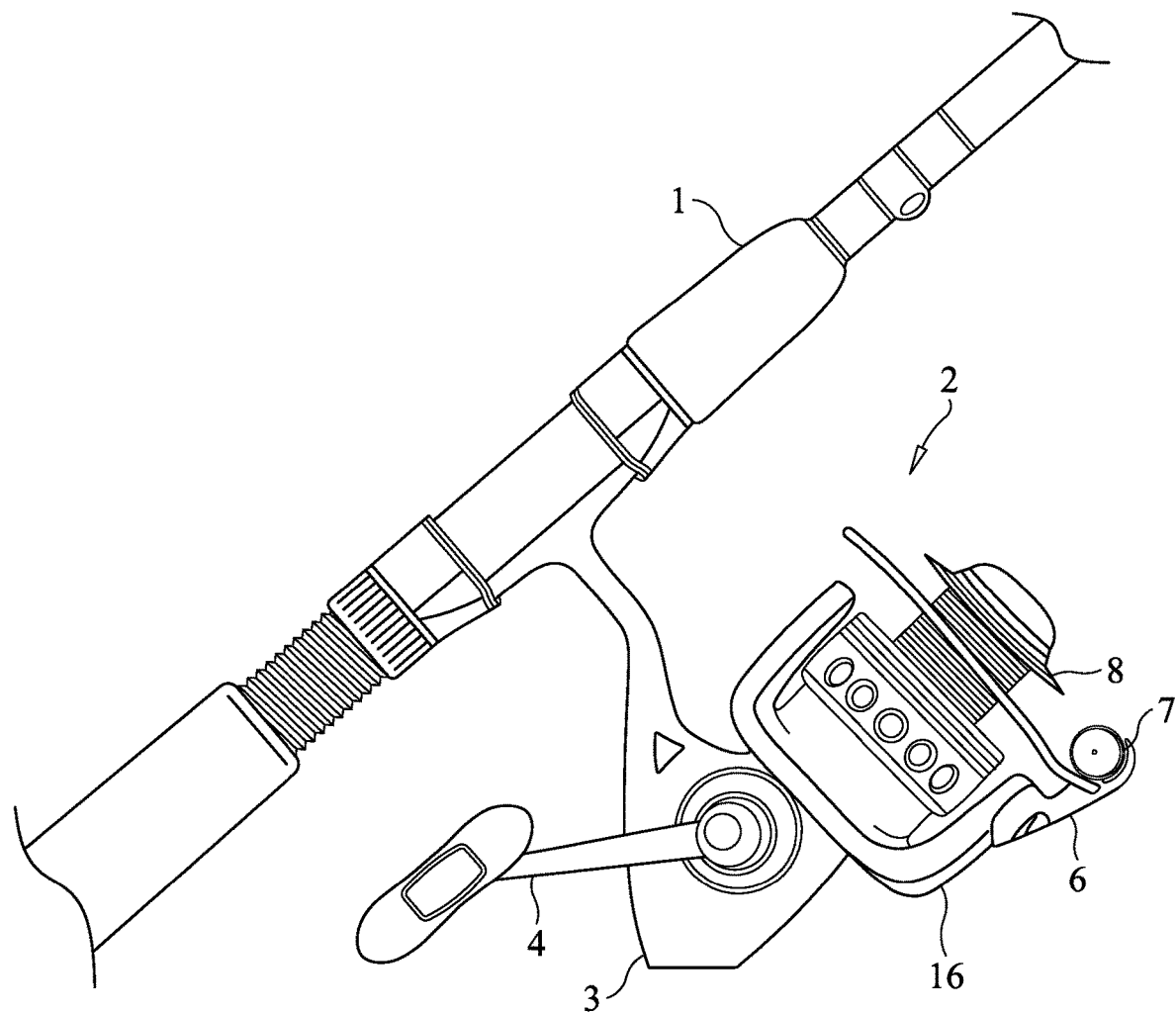
FIG. 1 depicts a fishing rod adapted with a spinning reel in accordance with the prior art.

With reference now to the drawings, FIG. 1 depicts a fishing rod 1 adapted with a spinning reel 2 in accordance with the prior art. Spinning reel 2 includes a body 3, a hand crank 4, a rotor 16 including a bail assembly 6 pivotally connected thereto, and wherein the bail assembly includes a line guide 7, and an open-face spool 8 disposed with an axis in generally parallel relation with a fishing pole. Rotation of hand crank 4 causes rotor 5 to rotate in a line winding mode, while further causing spool 8 to reciprocated in an axial direction to cause the line to wound on the spool evenly.

Figure 2:
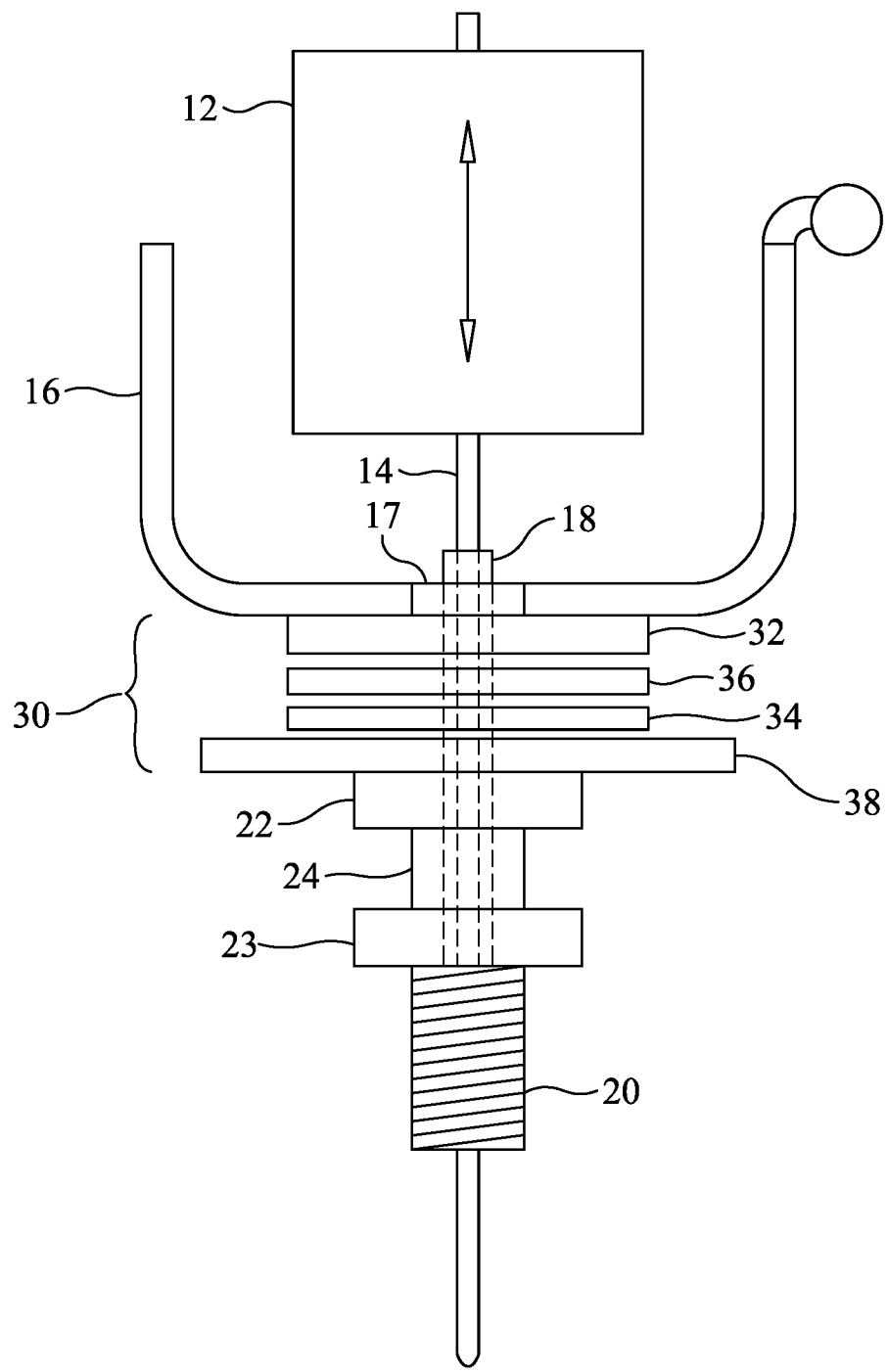
FIG. 2 is a schematic illustration of the operative components for a spinning type fishing reel configured with a bi-directionally rotating rotor and rotor drag mechanism in accordance with the present invention.

FIG. 2 is a schematic illustration of relevant components of a spinning type fishing reel, generally referenced as 10, adapted with a bi-directionally rotating rotor with a rotor drag system in accordance with the present invention. As seen in FIG. 2, fishing reel 10 includes a spool 12 affixed and keyed to a shaft 14 such that spool 12 reciprocates up and down as indicated by the arrow illustrated on spool 12. Shaft 14 is mechanically connected to a slider or other reciprocating mechanism (not shown) actuated by the fishing reel crank as is known in the art. A rotor 16 is disposed in surrounding relation with spool 12. Rotor 16 has an axially disposed ball bearing 17 which receives a rotor shaft 18 which is driven by the reel crank. Rotor shaft 18 comprises a tubular shaft and receives spool shaft 14 axially disposed therein. Rotor shaft 18 is driven by a gear 20, which in turn is driven by the fishing reel hand crank (not shown). Rotor shaft 18 is further supported by a pair of ball bearings, referenced as 22 and 23, disposed on opposing sides of a rotor anti-reverse bearing 24. The anti-reverse bearing 24 prevents reverse rotation of hand crank 4 when the reel is in a winding mode. As further discussed below, however, reverse rotation of rotor 16 is permitted in accordance with the teachings of the present invention.

A drag assembly, generally referenced as 30, is provided for rotor 16. Drag assembly 30 is to only drag assembly on the fishing reel. Drag assembly 30 includes a pair of drag plates, including a first drag plate 32 and a second drag plate 34, with a drag washer 36 disposed therebetween. As used herein, the terms drag plate and drag washer shall be broadly construed to refer to drag members which may comprise planar or disk-shaped members that may be configured to create rotational drag upon being placed in face-to-face contact, and wherein the drag force may be increased by application of an axial compressive force and decreased by removal of any such axial compressive force. First drag plate 32 is affixed to rotor 16 by suitable fastening means, such as mechanical fasteners or keyed connection. Second drag plate 34 is keyed to rotor shaft 18 by suitable fastening means, such as mechanical fasteners, press fit, or keyed connection. Variations on the number of drag plates and washers are considered within the scope of the present invention. As should be apparent drag plates 32 and 34, and drag washer 36, are configured to create a drag force that resists reverse rotation of rotor 16. Drag force is increased by compressing the drag assembly whereby friction generated between the drag plates and drag washer increases. Further drag force may be decreased to zero by decompressing the drag assembly whereby the drag plates and drag washer are no longer in face-to-face contact. Accordingly, the drag force is variable between a minimum force (e.g. no drag) and a maximum force, by user adjustment as further discussed below. As should be apparent, drag assembly operates on rotor 16 when rotor 16 is rotating in the reverse direction, such as when fighting a fish. A drag adjuster 38 is disposed on rotor shaft 18 between second drag plate 34 and bearing 22, and configured for axial movement by threaded engagement.

Clockwise rotation of drag adjuster 38 compresses drag plates 32 and 34 upon drag washer 36 thereby increasing drag force. Conversely, counter-clockwise rotation of drag adjuster 38 reduces the drag force applied to rotor 16 by increasing the spacing between drag plates 32 and 34. The drag may thus be adjusted by the user depending upon the line test weight to avoid overstressing of the line when fighting a fish.

The present invention thus provides a fishing spinning reel that prevents twist from being induced on the fishing line by allowing reverse rotation of the rotor with reverse rotation resistance provided by drag assembly 30. Thus, when fighting each rotation of hand crank 4 will not necessarily result in a corresponding rotation of rotor 16. By limiting rotor revolutions, the rotor imparts less, if any, line twist on the fishing line. Preventing line twist is significant in preventing line twist induced entanglements and thus avoids the time wasted by the fisherman untangling and relieving line twist.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A fishing reel comprising:
   a spool affixed and keyed to a spool shaft;
   said spool shaft being configured for axial reciprocation;
   a rotor disposed in surrounding relation with spool, said rotor capable of forward and reverse rotation;
   a rotor shaft driven by a gear connected to a hand crank; and
   a drag assembly applying drag between said rotor shaft and said rotor, said drag assembly including a first drag member having a first side affixed to said rotor and an opposing second side, and at least one other drag member keyed to said rotor shaft and disposed in face-to-face relation with said first drag member on said second said thereof;

a drag adjuster disposed on an opposite side of said at least one other drag member from said first drag member, said drag adjuster configured for rotational manual actuation whereby rotation of said drag adjuster in a first rotational direction axially compresses said drag assembly, and rotation of said drag adjuster in a second rotational direction axially relaxes said drag assembly.

2. The fishing reel according to claim 1, further including an anti-reverse bearing sandwiched between two ball bearings on an opposite side of said drag adjuster from said drag assembly.

3. A fishing reel comprising:

a reel body;

a hand crank rotationally connected to said reel body;

a tubular rotor shaft rotationally driven by rotation of said hand crank;

a spool affixed to a spool shaft, said spool shaft axially received within said tubular rotor shaft and configured for axial reciprocation in response to rotation of said hand crank;

a rotor disposed in surrounding relation with spool, said rotor capable of forward and reverse rotation;

a drag assembly including a first drag member having a first side affixed to said rotor and an opposing second side, and at least one other drag member disposed in face-to-face relation with the second side of said first drag member;

a drag adjuster disposed on an opposite side of said at least one other drag member from said first drag member, said drag adjuster configured for rotational manual actuation whereby rotation of said drag adjuster in a first rotational direction axially compresses said drag assembly, and rotation of said drag adjuster in a second rotational direction axially relaxes said drag assembly; and an anti-reverse bearing connected to said rotor shaft, said anti-reverse bearing sandwiched between two ball bearings on an opposite side of said drag adjuster from said drag assembly.

4. A fishing reel comprising:

a spool affixed and keyed to a spool shaft;

said spool shaft being configured for axial reciprocation;

a rotor disposed in surrounding relation with spool, said rotor capable of forward and reverse rotation;

a rotor shaft driven by a gear connected to a hand crank; and a drag assembly configured to selectively apply a drag force to said rotor, said drag assembly including a plurality of drag members, including a first drag member affixed to said rotor, and at least one other drag member keyed to said rotor shaft and configured for variable placement in face-to-face spaced or contacting relation with said first drag member.

5. The fishing reel according to claim 4, further including a user adjustable drag adjuster to allow manual adjustment of drag force.

\* \* \* \* \*